3,007,860
SAMPLING VALVE
Howard E. Rose, Hudson, Ohio, assignor to Borg-Warner Corporation, Chicago, Ill., a corporation of Illinois
Filed May 17, 1957, Ser. No. 659,828
5 Claims. (Cl. 204—193.2)

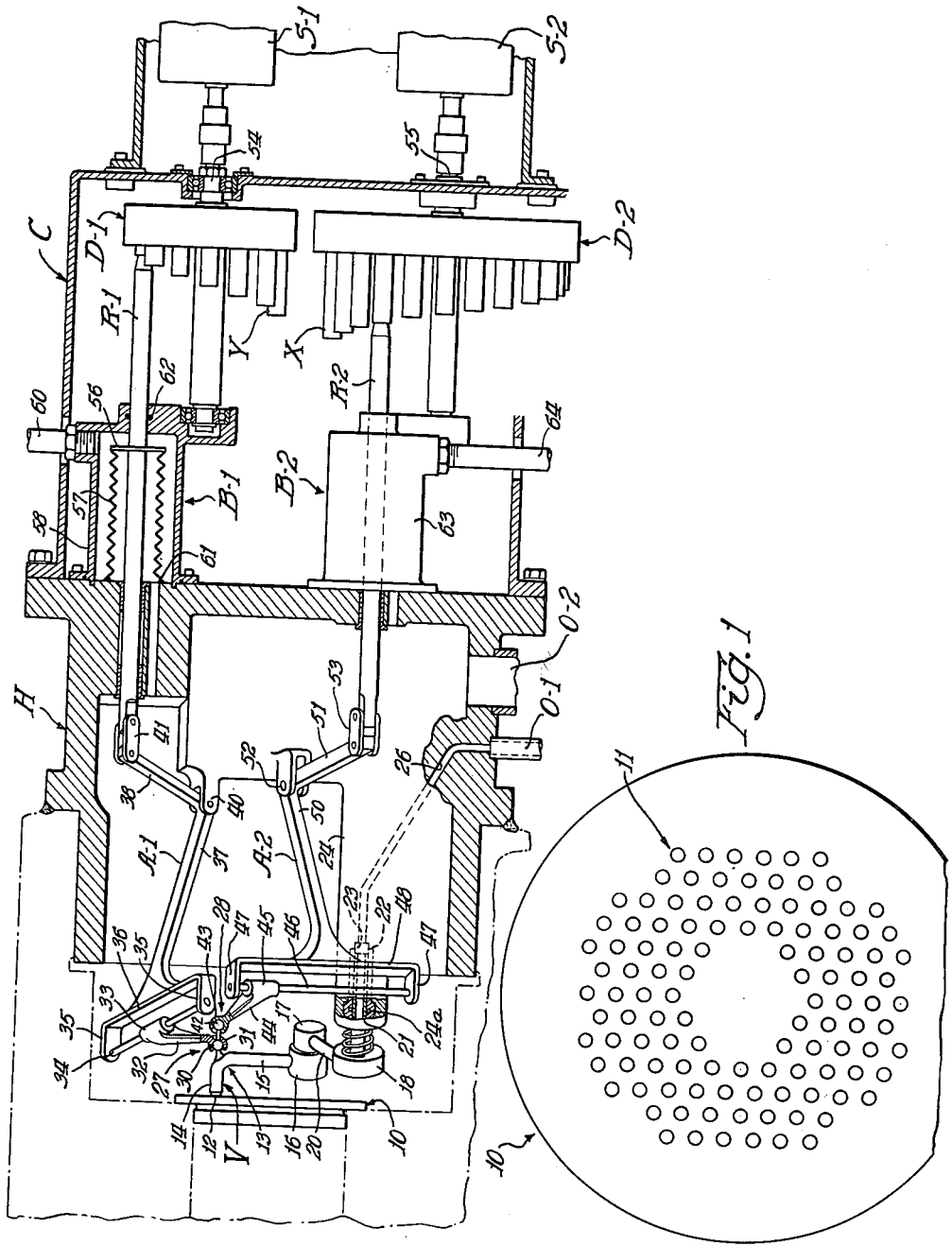

This invention relates in general to radioactivity of reactor coolants used in nuclear reactors and in particular to a new and improved valve which will permit the withdrawal and sampling of the reactor coolant from various locations in the reactor for testing of any radioactivity in the coolant.

It is a general object of this invention to provide a new and improved means of withdrawing samples of nuclear coolant from a nuclear reactor, and in particular, to a new and improved sampling valve whereby specimens or samples of the nuclear coolant may easily be withdrawn from the various locations of the coolant in the reactor for testing for radioactivity.

Heretofore when samples of the reactor coolant were desired to determine whether or not any part of the core of the reactor was defective, it was necessary to withdraw such samples from a number of ports located in a number of places about the reactor. By this invention the sampling ports are located in one easily accessible place whereby with the use of a single valve and an indexing mechanism, any particular port may be selected which is in communication with a selected part of the core.

In general, this invention is accomplished by a disc type valve which cooperates with a valve plate having a plurality of valve ports which, in turn, are in communication with various locations in the nuclear reactor so that the reactor coolant at these various locations may be communicated to these ports. This disc valve cooperates with a pair of arms which will transport this valve from one selected port to another selected port to selectively sample the coolant. These arms cooperate with an indexing means, operable either manually or automatically, to cause the arms to transport the valve to a selected port from which the operator desires to obtain a sample for testing for radioactivity. This indexing means comprises in general, a pair of rotatable drums, each having valve stop means, representing the number of rows of ports; one drum for the ports or rows in one direction and the other representing the number of rows of ports in another direction on a valve plate. By selectively positioning the drums, the arms will move the valve in one direction or another, or both, to the selected port from which the sample of radioactive coolant may be withdrawn.

Accordingly, it is a more particular object to provide a single valve which will cooperate with a multiple valve port and by the use of an indexing mechanism this single valve will cooperate with any one of the ports selected so that a sample of coolant from the reactor may be tested.

Another object of this invention is the provision in a nuclear reactor of simplified form of moving parts in a hermetically sealed, pressure tight housing with few moving parts between this sealed housing and the remaining mechanisms.

These and other objects and features of this invention will become apparent from the following description when taken with the accompanying drawings, in which:

FIG. 1 is a plan view of a valve plate showing to advantage the multiplicity of ports therein from which the nuclear coolant is withdrawn;

FIG. 2 is a semi-schematic, semi-perspective view of the sampling valve and the indexing mechanism which ultimately positions the valve proper in any one of the ports of the valve plate shown in FIG. 1.

Turning now to the drawings, and in particular, FIG. 1 thereof, there is shown a valve plate, indicated in its entirety as 10, having a plurality of ports indicated in their entirety as 11, formed in the valve plate 10, usually in horizontal and vertical rows as shown in the drawing. The number and position and/or rows of these ports will depend upon the number of locations from which the reactor coolant may be sampled. Each of these ports is in fluid communication with these various locations about a nuclear reactor by passageways and/or lines (not shown) so that reactor coolant from these various locations may be withdrawn for testing to determine if any part of the core (not shown) is defective.

In FIG. 2 there is shown a valve proper V which is arranged for cooperation with valve plate 10 previously described. This valve V is arranged for horizontal and vertical movement which movement is accomplished by a pair of arms A–1 and A–2 to which the valve V is connected. These arms cooperate with a pair of indexing drums D–1 and D–2, respectively. Drums D–1 and D–2 are rotated by a pair of servo motors S–1 and S–2 to which they are connected for rotation thereby. A pair of bellows B–1 and B–2 are each respectively connected to rods R–1 and R–2 so that expansion and contraction of the bellows causes axial movement to the right or to the left of the rods R–1 and R–2 to operate the arms A–1 and A–2. Valve V, connected to arms A–1 and A–2, is also in fluid communication with the sampling outlet O–1 so that fluid from the valve plate 10 will flow to the sampling outlet when the valve V is positioned on a selected port.

Housing H–1, containing arms A–1, A–2 and valve V and a part of rods R–1, R–2, being suitably designed to withstand high pressure, high temperature radioactive coolant is suitably sealed from container C by the cooperation of bellows B–1, B–2, which container is attached to housing H and encloses the remainder of rods R–1, R–2 and the drums D–1, D–2. Motors S–1, S–2 may or may not be enclosed in container C as desired. Also coolant in housing H flows freely therethrough and any excess flows out by-pass outlet O–2.

Referring now in more detail to FIG. 2, it can be seen that valve V comprises a frustoconical valve proper 12 formed on one end of a tubular member 13 having a horizontal portion 14 and a vertical portion 15. The other end of the tubular portion 13 is in communication with a pair of interlocking fluid tight drums 16 and 17 which are so constructed and arranged to permit one of the drums to rotate with respect to the other so that a joint-like operation can be accomplished to place valve proper 12 in fluid communication with a third hollow drum-like member 18. Drum-like member 18 is in fluid communication with drum 17 by hollow tubular member 20. A hollow sleeve member 21 is received in a second sleeve member 22 of cylindrical bore 23 formed in a portion 24 of the housing H. Sealing means such as O-ring seals 24a, prevent leakage between the sleeve 22 and the sleeve 21. Sleeve 21, being axially movable with respect to the sleeve 22, permits axial movement of the drum 18 to the right or to the left. A spring 25 encircling sleeve 21 and located between the drum 18 and one end of the housing portion 24 biases the drum to the left for a reason that will be apparent from the further discussion hereinafter. Drum 18 is in communication with sampling outlet O–1 by passage 26 which connects with the sampling outlet O–1 on one end and the two sleeve members 21 and 22 on the other. Thus fluid from valve proper 12 is free to flow through tube 13, drums 16 and 17, rod 20, drum 18, sleeves 21 and 22 and passage 26 to sampling outlet O–1, which members form a non-rigid connection between the valve and outlet.

At the juncture of the horizontal and vertical tubular portions 14 and 15 and extending in a direction opposite from the valve proper 12 there is provided a pair of universal joints 27 and 28. Universal joint 27 is formed by a ball 30 integrally formed with tubular member 13 received in a concave, substantially spherical, cup 31 formed on one end of a relatively short vertically extending arm 32. At the other end of arm 32 there is provided a sleeve-like member 33 in which is received a horizontally disposed rod 34 suspended between two horizontally extending prongs 35, 35 forming a part of a U-shaped member 36 at the left end of arm A-1. Arm A-1 is formed L-shaped to provide a substantially horizontally extending leg 37 and a vertically extending leg 38 which is pivoted for lever-like action at the juncture of the legs 37 and 38 about pin 40 fixedly attached to the housing. A linkage 41 connects the other end of leg 38 to rod R-1 whereby axial movement of the rod R-1 will cause the arm A-1 to move vertically which in turn will cause the valve V-1 to move vertically. In this manner the selection of a port in any horizontal row of the valve plate 10 may be accomplished.

In a similar manner, the universal joint 28 is formed by a ball 42 integrally formed with and connected to the valve V-1 received in a hollow spherical cup 43 formed in one end of a relatively small horizontally extending arm 44. The other end of arm 44 has a hollow sleeve-like member 45 formed thereon in which is received a vertically extending rod 46 suspended between a pair of prongs 47, 47 of a U-shaped member 48 formed on one end of arm A-2. Arm A-2, being L-shaped, has a pair of horizontally extending legs 50 and 51 mounted for pivoted lever-like action about a pin 52 fixedly attached to the housing. Linkage 53 connects the other end of leg 51 to the rod R-2 whereby any axial movement of the rod R-2 will ultimately cause the valve V-1 to move to the right or to the left so that any port on plate 10 in the vertical row may be selected.

In this manner, i.e., by operation of rods R-1 and R-2, any port in any of the vertical or the horizontal rows may be selected. Sleeve-like member 45 and rod 46 on arm A-2 and sleeve-like member 33 and rod 34 on arm A-1 permit the free horizontal and vertical movement necessary to sweep the valve plate 10 as is apparent.

Since each of the ports are formed in horizontal and vertical rows, each port has, as it were, certain co-ordinates representing its position. Thus, an indexing mechanism in which co-ordinates may be duplicated will select a particular port having the selected co-ordinates. In this embodiment, drums D-1 and D-2 each of which are operatively connected, respectively, to arms A-1 and A-2 having a plurality of axially extending stop means or rods of unequal lengths, as indicated in their entirety, as Y and X, respectively. The number of vertical ports on plate 10 and the number of stop means X will depend upon the number of horizontal ports on the plate 10. For example, if there are 13 rows of vertical ports and 23 rows of horizontal ports, drum D-1 will have 13 rods of variable lengths and drum D-2 will have 23 stops of variable lengths. Rotation of the drum D-1 by the servo motor S-1 drivingly connected thereto by shaft means 54 and rotation of the drum D-2 by the servo motor S-2 drivingly connected thereto by shaft means 55 any combination of stop means and these co-ordinates may be selected by the position of drums D-1 and D-2. Positioning of rods R-1 and R-2 against the selected stop means X and Y will position the valve proper at the selected port on the valve plate 10.

In order to allow free rotation of drums D-1 and D-2 without interference by the rods R-1 and R-2 each rod is fixedly connected to bellows B-1 and B-2. In more particularity, rod R-1 is affixed to one end 56 of expansible bellows 57. Bellows 57 is enclosed in a housing 58 into which is communicated air under pressure from a source of supply (not shown) through conduit 60. The position of the bellows is suitably sealed as at 61 and the housing with respect to the rod R-1 by seals 62. Air thus introduced into the interior of the housing 58 and being of a higher pressure than the coolant within the interior of the bellows causes the bellows to collapse moving the rod R-1 to the left by the differential in pressure thus formed between the interior of the housing and the interior of the bellows. Simultaneously, air is introduced into the housing 63 of bellows B-2 from conduit 64 to compress a similar bellows (only partly shown) affixed to rod R-2. Since the operation of bellows B-1 and B-2 are identical, no further description is deemed necessary.

Air thus introduced into the housings 58 and 63 causes rods R-1 and R-2 to each respectively move to the left as shown in the drawings, freeing drums D-1 and D-2 for rotation and at the same time causing valve V to disengage from the previously selected port. When the desired co-ordinate is reached i.e., when the selected stop means on D-1 and D-2 are in alignment with rods R-1 and R-2 respectively, the air under pressure in housings 58 and 63 is released or withdrawn allowing the rods R-1 and R-2 to move to the right by means of the pressure of the reactor coolant reaction inside of the bellows and to mate with the ends of their respective stop means. Simultaneously, arms A-1 and R-2 aided by the action of spring 25 cause the valve V to engage the port which corresponds to the co-ordinates indexed by the drums D-1 and D-2. Fluid thus in communication with the selected port, may be withdrawn through sampling outlet O-1.

While there has been shown two drums rotated in an automatic manner by servo motors S-1 and S-2, obviously the drums could be rotated manually and also while there is shown only one valve V, obviously, more than one valve could be affixed to the arms A-1 and A-2 if desired. Too, the ports may be staggered or arranged to be indexed by drums and stop means responsive to other coordinate systems if desired.

While this invention has been described in connection with only one embodiment thereof and various parts with reference to a particular direction it is to be understood that these descriptions are by way of illustration and not by way of limitation and the scope of this invention is defined solely by the appended claims.

I claim:

1. In a nuclear reactor having a reactor coolant, a porting plate having a plurality of ports, each of which is in communication with a different place in the coolant, in combination, an outlet, a valving means for co-operating with said porting plate to place said coolant in a selected port in fluid communication with said outlet, said valve means having means providing a non-rigid connection with said outlet to maintain connection therewith upon being moved, and means for indexing said valving means to any one of the selected ports, said indexing means comprising a plurality of pivotal arms each having mounting means restricting each arm to pivotal movement within one of mutually perpendicular planes, means mounting said valve means on each of said arms such that upon pivotal movement of each arm or of both arms simultaneously, said valve will be caused to change the magnitude of one or more co-ordinates relative to the movement planes of said arms in direct proportion to the movement of the arms, each arm when pivoted causing said valving means to traverse said porting plate in one of a plurality of mutually perpendicular directions, and means for selectively pivoting said arms whereby any port on said porting plate may be selected.

2. In a nuclear reactor having a reactor coolant, a porting plate having a plurality of ports, each of which is in communication with a different place in the coolant, in combination, an outlet, a valving means for cooperating with said porting plate to place said coolant in a selected port in fluid communication with said outlet, said valve means having means providing a non-rigid connection with said outlet to maintain connection therewith upon being moved, and means for indexing said valving means to any one of the selected ports, said indexing means comprising a plurality of pivotal arms each having mounting means restricting each arm to pivotal movement within one of mutually perpendicular planes thereof, means mounting said valve means on one extremity of each of said arms such that upon pivotal movement of each arm or of both arms simultaneously, said valve will be caused to change the magnitude of one or more co-ordinates relative to the movement planes of said arms in direct proportion to the movement of the arms, each arm when pivoted causing said valving means to traverse said porting plate in one of a plurality of mutually perpendicular directions, a plurality of axially movable members, each member being pivotal connected to one of said arms whereby axial movement of each member causes the respective arm to pivot, and means for selectively, axially moving said members whereby any port on said porting plate may be selected.

3. In a nuclear reactor having a reactor coolant, a porting plate having a plurality of ports, each of which is in communication with a different place in the coolant, in combination, an outlet, a valving means for cooperating with said porting plate to place said coolant in a selected port in fluid communication with said outlet, said valve means having means providing a non-rigid connection with said outlet to maintain connection therewith upon being moved and means for indexing said valving means to any one of the selected ports, said indexing means comprising a pair of pivotal arms each having mounting means restricting each arm to pivotal movement within one of mutually perpendicular planes, means mounting said valve means on the free extremities of each of said arms such that upon pivotal movement of each arm or of both arms simultaneously, said valve will be caused to change the magnitude of one or both co-ordinates relative to the movement planes of said arms in direct proportion to the movement of the arms, each arm when pivoted causing said valving means to traverse said porting plate in one of two perpendicular directions, a pair of axially movable members each being pivotal connected to one of said arms whereby axial movement of each member causes the respective arm to pivot, and means for selectively, axially moving said members whereby any port on said porting plate may be selected.

4. In a nuclear reactor having a reactor coolant, a porting plate having a plurality of ports, each of which is in communication with a different place in the coolant, in combination, an outlet, a valving means for cooperating with said porting plate to place said coolant in a selected port in fluid communication with said outlet, said valve means having means providing a non-rigid connection with said outlet to maintain communication therewith upon being moved, and means for indexing said valving means to any one of the selected ports, said indexing means comprising a plurality of pivotal arms each having mounting means restricting each arm to pivotal movement within one of mutually perpendicular planes, means mounting said valving means on each of said arms to provide displacement and change of co-ordinate positioning of said valve means in response to pivotal movement of said arms either separately or simultaneously, each arm when pivoted being adapted to cause said valving means to traverse said porting plate in one of a plurality of mutually perpendicular directions, a plurality of axially movable members each being pivotal connected to one of said arms whereby axial movement of each member causes the respective arm to pivot, a plurality of rotatable elements each having a plurality of abutment means, and means for selectively rotating said elements whereby a desired abutment means on each element is adapted to limit the axial movement of one of said members and thus position the respective arm in a selected position whereby said valving means is indexed to a selected port.

5. In a nuclear reactor having a reactor coolant, a porting plate having a plurality of ports, each of which is in communication with a different place in the coolant, in combination, an outlet, a valving means for cooperating with said porting plate to place said coolant in a selected port in fluid communication with said outlet, said valve means having means providing a non-rigid connection with said outlet to maintain connection therewith upon being moved, and means for indexing said valving means to any one of the selected ports, said indexing means comprising a plurality of pivotal arms each having mounting means restricting each arm to pivotal movement within one of mutually perpendicular planes, means mounting said valving means on each of said arms to provide displacement and change of co-ordinate positioning of said valving means in response to pivotal movement of said arms, each arm when pivoted being adapted to cause said valving means to traverse said porting plate in one of a plurality of mutually perpendicular directions, a plurality of axially movable members each being pivotal connected to one of said arms whereby axial movement of each member causes the respective arm to pivot, a plurality of rotatable elements each having a plurality of abutment means, means to selectively rotate each element in order to position selected abutment means thereof so as to be engageable by said members, means to axially move said members from engagement with said rotatable elements whereby said elements may be rotated to so position selected abutment means thereof, and means for causing said members to be axially moved into engagement with the selected abutment means whereby said valving means is indexed to a selected port.

References Cited in the file of this patent

UNITED STATES PATENTS 2,756,858    Kasschau   _____ July 31, 1956
2,782,158    Wheeler   _____ Feb. 19, 1957

FOREIGN PATENTS 803,166    Germany  _____ Mar. 1, 1951

OTHER REFERENCES

Nucleonics, vol. 14 (December 1956), pages S20 and S21.